No. 611,065. Patented Sept. 20, 1898.
L. N. DOBBINS.
PRUNING IMPLEMENT.
(Application filed Apr. 8, 1898.)
(No Model.)
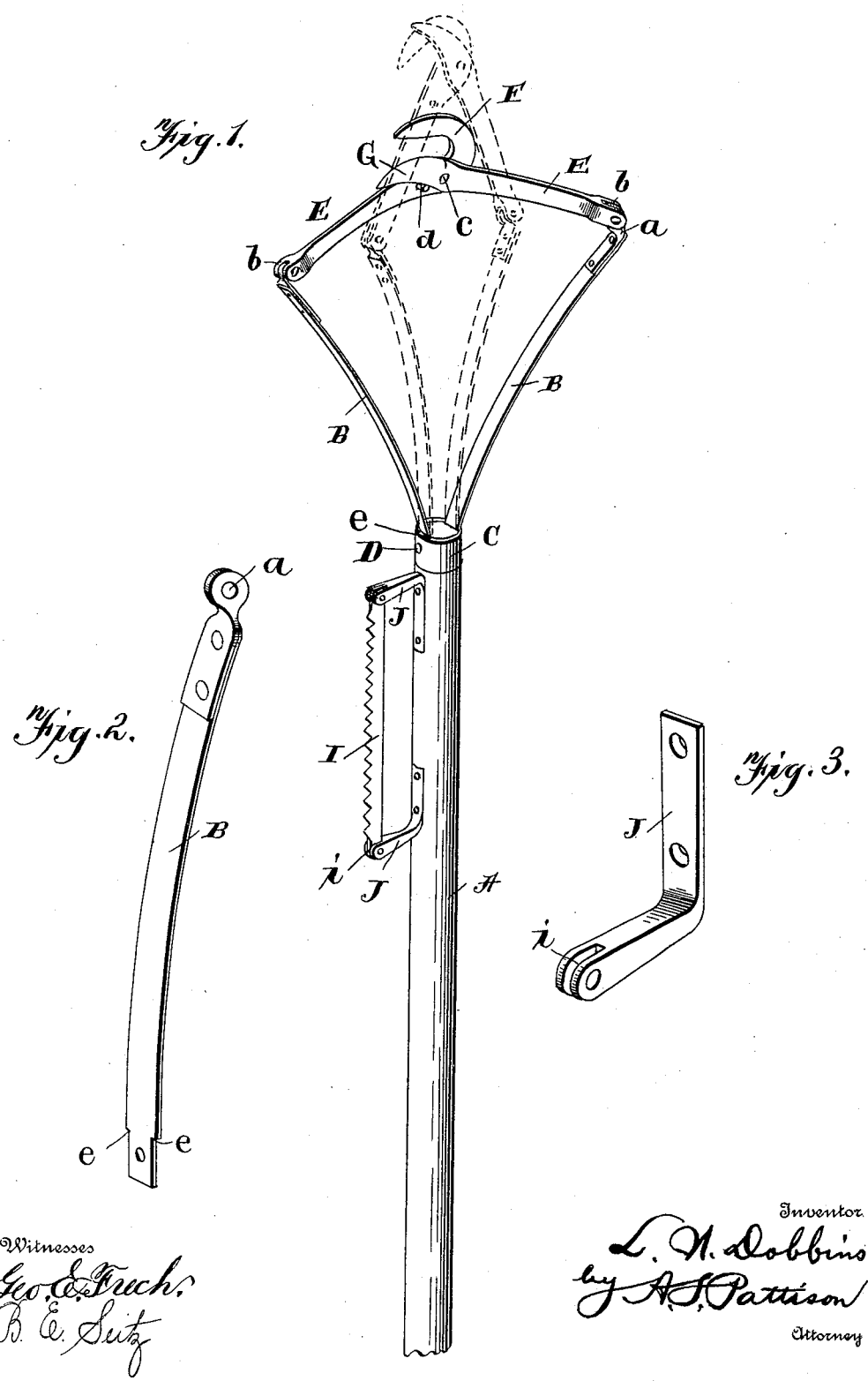

UNITED STATES PATENT OFFICE.

LEVI N. DOBBINS, OF CHAPEL, WEST VIRGINIA.

PRUNING IMPLEMENT.

SPECIFICATION forming part of Letters Patent No. 611,065, dated September 20, 1898.

Application filed April 8, 1898. Serial No. 676,921. (No model.)

*To all whom it may concern:*

Be it known that I, LEVI N. DOBBINS, a citizen of the United States, residing at Chapel, in the county of Braxton and State of West Virginia, have invented new and useful Improvements in Pruning Implements, of which the following is a specification.

My invention relates to improvements in pruning implements and pertains to an implement constructed and adapted to automatically cut a limb by a downward pull upon the handle.

The object of my invention is to provide a simple pruning implement comprising a handle provided with upwardly-projecting flexible or spring arms rigidly connected with the handle, the said spring-arms normally diverging, and inwardly-extending arms having their outer ends pivotally connected with the free ends of the springs, the inner ends of the arms pivoted together and provided with cutting-blades, one of the cutting-blades being in the form of a hook, and also to provide a saw at the side of the handle, all of which will be more fully described and illustrated hereinafter.

In the accompanying drawings, Figure 1 is a perspective view of an implement embodying my invention, the cutting-blades being shown open in full lines and closed in dotted lines. Fig. 2 is a detached perspective view of one of the spring-arms. Fig. 3 is a detached view of one of the arms forming the frame of the saw.

Referring to the drawings, A indicates the handle, of any desired length.

B are spring-arms having their upper ends rigidly connected with the handle A in any desired manner. Preferably these arms are united to the handle through a band or sleeve C, as shown, with pins D passing through the sleeve and through openings in the ends of the spring-arms B. The lower ends of these spring-arms are preferably reduced in size, as shown, to form shoulders *e*, which abut against the upper edge of the sleeve, thus overlapping and preventing the lateral oscillation of the arms. These spring-arms B are preferably flat, as shown, and their normal tension is outward or away from each other. The upper ends of these spring-arms are provided with the eyes *a*, which extend into slots *b* in the outer ends of the knife-arms E. These knife-arms extend inward and are pivoted together at the point *c*. One of these arms projects upward and is provided with the hook-shaped knife F, and the other arm is provided with a curved blade G, which lies below the hook-blade, as shown. To prevent the spring-arms B from spreading so far as to carry the knife-arms so low down as to prevent their proper operation and to limit the movement of these arms, the one having the hooked blade is provided with a stop or projection *d*, with which the back edge of the blade engages. This holds the knife-arms in a slightly upwardly inclined position, with the hook end of the knife F open ready for the reception of a limb to be severed.

In operation the hook-knife F is caught over the limb to be cut, and a downward pull is exerted upon the handle, which, owing to the flexibility of the spring-arms B, will draw their ends, and consequently the ends of the knife-arms, together to the position shown in dotted lines in Fig. 1, thus forcing the blade G up adjacent the hooked knife F, and coact therewith for the purpose of cutting the limb. When the object has been cut, the spring-arms resume their normal position, thus separating the blades, ready for another cutting action.

I also provide a saw I, which consists of the two L-shaped arms J, having their inner portions rigidly connected to the handle of the implement and their outer ends provided with slots *i* to receive the saw. It will be noted that the handle forms a part of the frame of the saw in that the L-shaped arms are secured to the handle, the handle thus forming a part of the frame of the saw.

An implement of the above-described construction is simple, cheap, and effective in its operation.

Having thus described my invention, what I claim, and desire to secure by Letters Patent, is—

1. A pruning implement comprising a handle, upwardly-projecting spring-arms having their lower ends connected with the handle, knife-arms having their outer ends connected to the upper ends of the spring-arms and extending inward and pivoted together, one of the arms having an upwardly-projecting hook-shaped cutting-knife and the other arm a cutting-blade lying thereunder, substantially as described.

2. A pruning implement comprising a handle, upwardly-projecting flexible arms having their lower ends connected to the handle, knife-arms having their outer ends pivotally connected with the upper ends of the spring-arms, one of the knife-arms having a hook-shaped knife, the said arms pivoted together below the hooked knife, the other arm having a blade lying below the hooked knife, and one of the knife-arms having a stop for the purpose of limiting the opening movement of the knife and blade, substantially as described.

3. A pruning implement comprising a handle, upwardly-projecting flexible arms having their lower ends rigidly connected with the handle, knife-arms having their inner ends pivoted together and provided with projecting cutting edges, the outer ends of the arms pivotally connected to the upper ends of the flexible arms, one of the arms having a projecting stop lying below the blade of the other arm for the purpose of limiting their opening movement, substantially as described.

In testimony whereof I have hereunto set my hand in the presence of two subscribing witnesses.

LEVI N. DOBBINS.

Witnesses:
JOHN NEWLON,
N. VAN STIELLSON.